April 12, 1927.

J. T. ELLIOT

TABLE

Filed April 18, 1925   2 Sheets-Sheet 1

1,624,862

INVENTOR.
John T. Elliot,
BY
ATTORNEYS.

April 12, 1927.  
J. T. ELLIOT  
TABLE  
Filed April 18, 1925   2 Sheets-Sheet 2

1,624,862

INVENTOR.  
John T. Elliot  
BY Everett Rook,  
ATTORNEYS.

Patented Apr. 12, 1927.

1,624,862

UNITED STATES PATENT OFFICE.

JOHN T. ELLIOT, OF IRVINGTON, NEW JERSEY, ASSIGNOR TO M. WEISS CORPORATION, A CORPORATION OF NEW JERSEY.

TABLE.

Application filed April 18, 1925. Serial No. 24,082.

This invention relates to a combined bedside table, cabinet, and food tray, particularly designed for use in hospitals, one object of the invention being to provide in one device a cabinet, a bedside table, and a food tray so arranged that the top of the cabinet serves as the table and the cabinet serves as a pedestal for supporting the food tray in a horizontal position over the bed in convenient relation to the patient, the food tray being adjustably mounted on the cabinet and table so that it may be placed at various elevations and swung into and out-of-the-way position along one side of the cabinet and table when not in use.

Another object of the invention is to provide such a device embodying novel and improved features of construction for adjustably mounting the food tray upon a cabinet and table.

Further objects are to provide a device of the character described including means vertically adjustably mounted on the cabinet and table and having pivotally mounted thereon the food tray to swing about a horizontal axis into a substantially horizontal position or into a position substantially parallel with one side of the table; to provide novel and improved means for mounting the food tray so that it can be bodily removed from its supporting means, and to obtain other results and advantages as may be brought out by the following description.

Referring to the accompanying drawings, in which the same reference characters designate corresponding and like parts throughout the several views, Figure 1 is a perspective view of a combined cabinet, bedside table and food tray showing the tray in operative position;

Figure 4 is a fragmentary perspective view of the pivoted end of the food tray and its supporting means.

Figure 1:
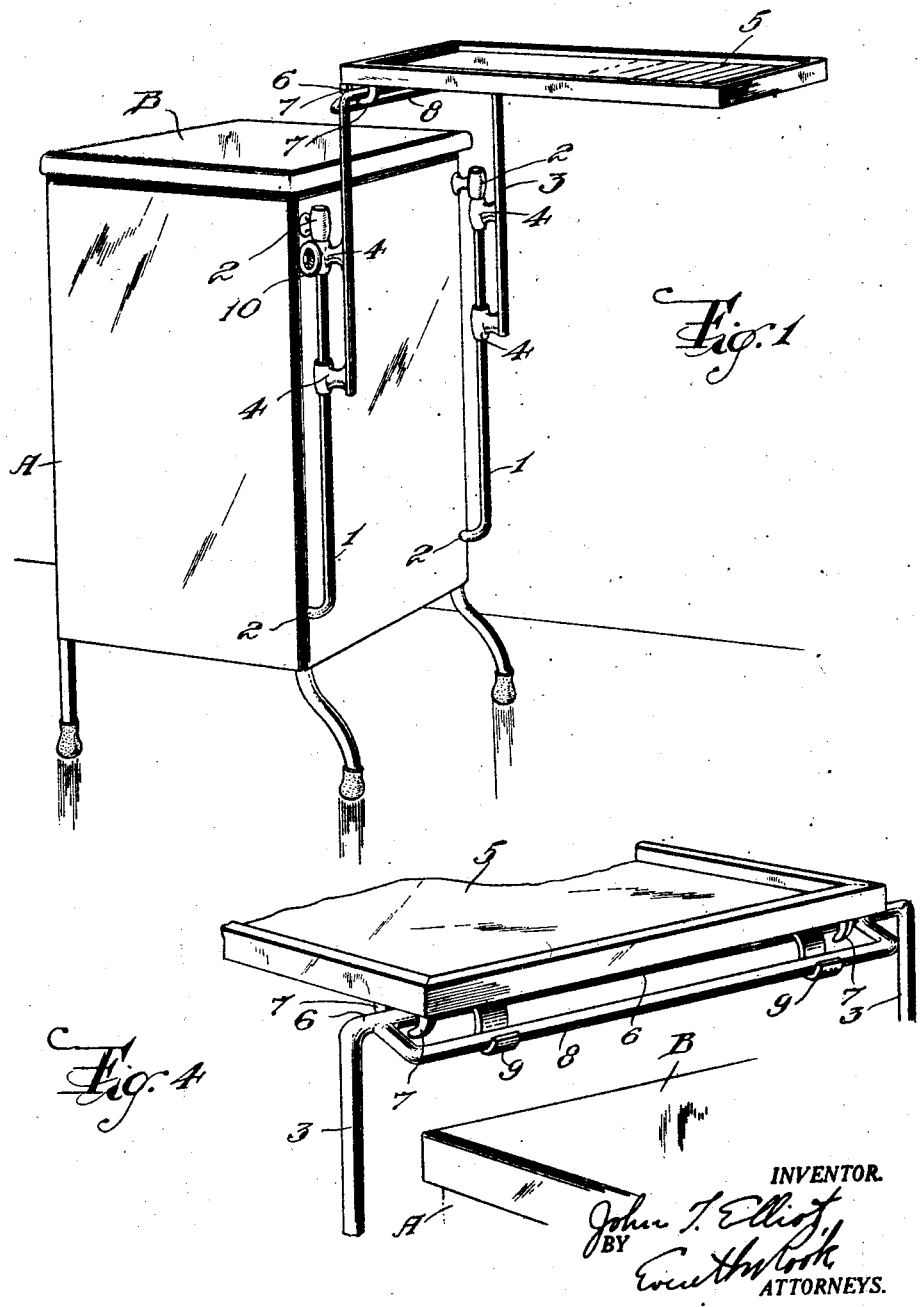

Specifically describing the present embodiment of the invention, the reference character A designates a cabinet which may be formed with drawers and other suitable compartments (not shown), and which has a substantially flat horizontal top B to serve as a table for supporting various articles which may be used in the treatment of a patient.

Upon one side of the cabinet A is arranged a pair of spaced and parallel vertical rods 1 each of which has its opposite ends fixedly secured to the cabinet in any suitable manner, as indicated at 2. An inverted U-shaped food tray supporting member 3 has its arms slidably mounted upon the respective rods 1 by any suitable means such as the sleeves 4 fixedly connected to and projecting at substantially right angles from the respective arms of the member 3 and slidable on the rods 1. The sleeves 4 are spaced longitudinally of the arms of the member 3 to provide a stable support for the member for preventing it from wabbling or binding upon the rods. One of the sleeves 4 upon each arm of the member 3 is formed with suitable means such as a clamping screw 10, for holding the member 3 in adjusted positions upon the rods 1.

A food tray 5 has one end pivotally and removably connected to the horizontal base portion 6 of the member 3. This pivotal connection preferably comprises a pair of spaced oppositely arranged hooks 7 upon the bottom of the tray at each longitudinal side thereof, the ends of said hooks being spaced apart a distance slightly greater than the diameter of the base portion 6 of the member 3 to permit the tray to be placed upon and removed from said member.

The base portion 6 of the member 3 is provided with an integral extension bar 8, a portion of which is arranged substantially parallel to the base portion 6, and the end of the tray is provided with two spaced hooked arms 9 to underlie the extension bar 8.

Figure 2:
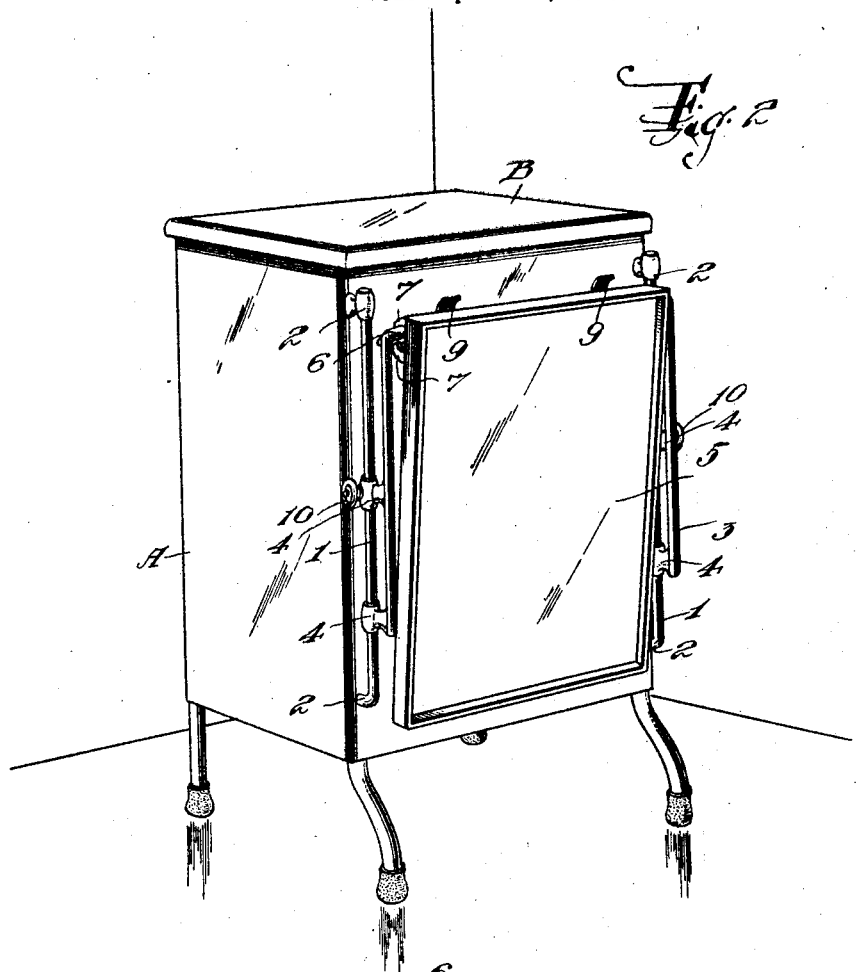
Figure 2 is a similar view showing the food tray in its inoperative position.
Figure 3:
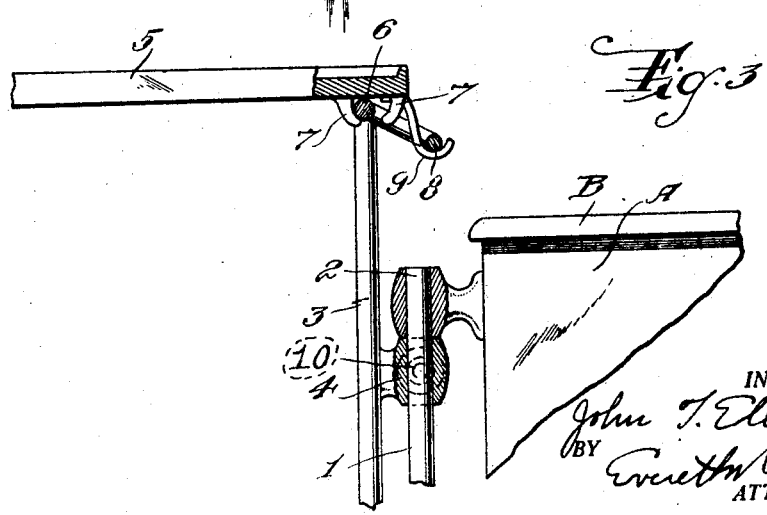
Figure 3 is a fragmentary transverse vertical sectional view through the supporting means for connecting the food tray to the cabinet and table.

The tray 5 is applied to the member 3 by holding it endwise to cause the hooked arms 9 to underlie the extension bar 8, whereupon the tray is swung downwardly to cause the hooks 7 to slip over the base portion 6 of the member 3, said base portion entering between the hooks of the respective pairs, as shown in Figure 3. The tray 5 is thereby supported in horizontal position at substantially right angles to the plane of the member 3. The cabinet A serves as a pedestal to support the tray 5 and may be moved in proper relation to the bed to position the tray in a convenient relation to the patient. When it is desired to place the tray in an out-of-the-way position, it is swung upward about one of the hooks 7 of each pair until the hooked arms 9 clear the extension bar 8, whereupon the tray is pulled forwardly to cause the other hooks 7 to engage the base 6 of the member 3, after which the tray is permitted to swing by action of gravity upon the hook members 7 about the base 6 into a substantially vertical position parallel to the cabinet A, as shown in Figure 2. By merely loosening the clamping screws 10 the member 3 may be slid longitudinally of the rods 1 to adjust the height of the tray 5. The tray may be bodily removed from the member 3 by swinging the tray upwardly to cause the hooked arms 9 to clear the bar 8, and then raising the tray to cause the ends of the hook members to slip from the base portion 6 of the member 3.

It will be observed that the member 3, the hooks 7 and the hooked arms 9 form means for pivotally mounting the tray upon the table so that the tray may be swung both into a substantially horizontal position whereby the table serves as a pedestal for the tray, and into a position substantially parallel to the side of the table, the rods 1, sleeves 4 and screws 10 serving as means for adjusting the member 3 to vary the height of the tray. Also, the tray being narrower than the side of the table upon which it is mounted, the table serves as a protection for the tray and prevents contact of the tray with other articles of furniture, and enables the whole combination to be moved as easily as could the table itself be moved. Therefore, it is not necessary to provide a special place for the tray when it is not in use, or to remove the tray from the room to get it out of the way.

I am aware that it is not broadly new to adjustably support a food tray or the like in such a relation to a bed as to permit the tray to be swung into operative position over the bed, or into an out-of-the-way position alongside of or under the bed. Furthermore, I am aware that various articles such as book supports and table leaves have been mounted upon various other supports so as to be swung into either horizontal operative position or substantially vertical inoperative and out-of-the-way position. Therefore, I do not desire to be understood as attempting to claim such constructions, but while I have shown the invention as embodying certain details of construction, it will be understood that this is mainly for the purpose of illustrating the principles of the invention and that many modifications and changes may be made in the construction without departing from the spirit or scope of the invention. Accordingly, I do not desire to be understood as limiting myself except as required by the following claims when construed in the light of the prior art.

Having thus described the invention, what I claim is:

1. The combination of a support, a horizontal supporting bar, means for vertically adjustably mounting said supporting bar on said support, and a tray pivotally mounted on said bar so that said tray may be swung into a horizontal position with said support serving as a pedestal and into an out-of-the-way position substantially parallel to the side of said support, said bar permitting adjustment of the height of said tray and being formed with an extension position parallel thereto, said tray being provided with hooked arms to underlie said extension portion to hold the tray in horizontal position.

2. The combination of a tray, a horizontal supporting member, means for mounting said tray on said member for pivotal and limited longitudinal movement, said supporting member having an extension portion parallel thereto and said tray having a hooked arm to removably underlie said extension portion to hold said tray in a horizontal position, said hooked arm being applicable to and removable from said extension portion upon combined pivotal and longitudinal movement of said tray, whereby the tray may be placed in an out-of-the-way substantially vertical position or in a horizontal operative position.

3. The combination of a table, a pair of spaced parallel and vertical guide rods fastened to one side of said table, an inverted U-shaped member connected at spaced points in the length of each of its arms to one of said rods so as to be vertically slidable thereon, and a tray pivotally mounted at one end upon the base portion of said U-shaped member so that said tray may be swung into a horizontal position with the table serving as a pedestal and into an out-of-the-way position substantially parallel to said side of said table, said U-shaped member permitting adjustment of the height of said tray and being formed with an extension bar parallel to said base portion, and the pivoted end of said tray having hooked arms to underlie said bar to hold the tray in horizontal position.

4. The combination of a horizontal supporting bar, a tray having a pair of spaced and opposed hooks to removably receive said bar between them to mount said tray on said bar for pivotal movement and limited movement transversely of said bar so that the tray may be placed in a horizontal position or a vertical position or removed from said bar, said bar having an extension portion parallel thereto and said tray having a hooked arm to removably underlie said extension portion, said hooked arm being applicable to and removable from said extension portion upon combined pivotal movement of said tray and movement thereof transversely of said bar.

JOHN T. ELLIOT.